United States Patent
Petroskie et al.

(10) Patent No.: US 7,685,731 B1
(45) Date of Patent: Mar. 30, 2010

(54) BLADE VERIFICATION PLATES AND METHOD OF USE

(75) Inventors: Robert Michael Petroskie, Roebuck, SC (US); Creston Lewis Dempsey, Mauldin, SC (US); Roberto Anthony Nunez, Greenville, SC (US)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 12/209,257

(22) Filed: Sep. 12, 2008

(51) Int. Cl.
*G01B 3/30* (2006.01)
*G01B 5/24* (2006.01)

(52) U.S. Cl. .................................... 33/530; 33/645
(58) Field of Classification Search .................. 33/530, 33/645
See application file for complete search history.

(56) References Cited

U.S. PATENT DOCUMENTS

| | | | | |
|---|---|---|---|---|
| 3,996,670 A | * | 12/1976 | Joyal et al. ............... | 33/530 |
| 4,056,888 A | * | 11/1977 | Hughey, Jr. ............... | 33/530 |
| 4,146,967 A | * | 4/1979 | Rohner et al. ............. | 33/530 |
| 4,395,827 A | * | 8/1983 | Stowe et al. .............. | 33/655 |
| 4,411,073 A | * | 10/1983 | Ryan ....................... | 33/530 |
| 4,642,901 A | * | 2/1987 | Webb ....................... | 33/530 |
| 5,031,335 A | * | 7/1991 | Kimmelman ............... | 33/628 |
| 5,152,070 A | * | 10/1992 | Sorokes .................... | 33/530 |
| 5,152,071 A | * | 10/1992 | Bergeron ................... | 33/530 |
| 5,993,160 A | * | 11/1999 | Bouchard et al. ........ | 416/193 A |
| 2009/0223073 A1 | * | 9/2009 | Tu .......................... | 33/530 |

* cited by examiner

*Primary Examiner*—Christopher W Fulton
(74) *Attorney, Agent, or Firm*—Cantor Colburn LLP

(57) ABSTRACT

A first plate includes an opening configured to be placed over a blade of a first rotor. A second plate includes an opening configured to be placed over a blade of a second rotor. Each plate includes a first pin configured to contact a leading edge of a blade located on one side of the blade in the opening and a second pin configured to contact a leading edge of a blade located on an opposite side of the blade in the opening, and a third pin configured to contact a leading edge of the blade in the opening. An indicator line is marked on the first plate and a pair of boundary lines marked on the second plate are spaced apart a distance indicative of an acceptable range for blade clocking between the first and second rotors when the indicator line is located between the boundary lines.

20 Claims, 5 Drawing Sheets

BLADE VERIFICATION PLATES AND METHOD OF USE

BACKGROUND OF THE INVENTION

The subject matter disclosed herein relates to gas turbine engines and, more particularly, to blade verification plates that facilitate the location of the leading edge of the blades on a rotor within a turbine engine, such as a gas turbine engine or a steam turbine engine, and further provide an indication as to whether the blade clocking is within an acceptable tolerance range.

Clocking of blades on rotating rotors or wheels is common in gas turbine engines, especially on modern rotors. Clocking generally refers to the relative positioning of two rows of blades or airfoils with respect to each other (e.g., the blades on two adjacent stages of a compressor), wherein such blade positioning can affect the efficiency of the gas turbine. Prior methods for determining whether the blade clocking is within an acceptable tolerance range involve manual measurements taken using a plum line and a ruler with two or more stages stacked on top of each other. This method suffers from obvious inherent inaccuracies associated with manual measurements and is time consuming. It is also known to use a computerized measurement system for ascertaining blade clocking. However, this method is costly.

BRIEF DESCRIPTION OF THE INVENTION

According to one aspect of the invention, a first blade verification plate includes an opening configured to be placed over a blade affixed to a first rotor, and a second blade verification plate includes an opening configured to be placed over a blade affixed to a second rotor. An indicator line is marked on the first plate and a pair of boundary lines are marked on the second plate, wherein the boundary lines are spaced apart a predetermined distance indicative of an acceptable range for blade clocking between the first and second rotors when the indicator line is located between the boundary lines when each plate is placed over the corresponding blade affixed to the first and second rotors.

According to another aspect of the invention, a method for determining whether blade clocking between first and second rotors each having blades is within an acceptable tolerance range includes placing a first blade verification plate having an opening over a blade of the first rotor; placing a second blade verification plate having an opening over a blade of the second rotor; and determining whether blade clocking between the first and second rotors is within an acceptable tolerance range by inspecting a position of an indicator line marked on the first plate with respect to a pair of boundary lines marked on the second plate, wherein the boundary lines are spaced apart a predetermined distance indicative of an acceptable range for blade clocking between the first and second rotors when the indicator line is located between the boundary lines when each plate is placed over the corresponding blade of the first and second rotors.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
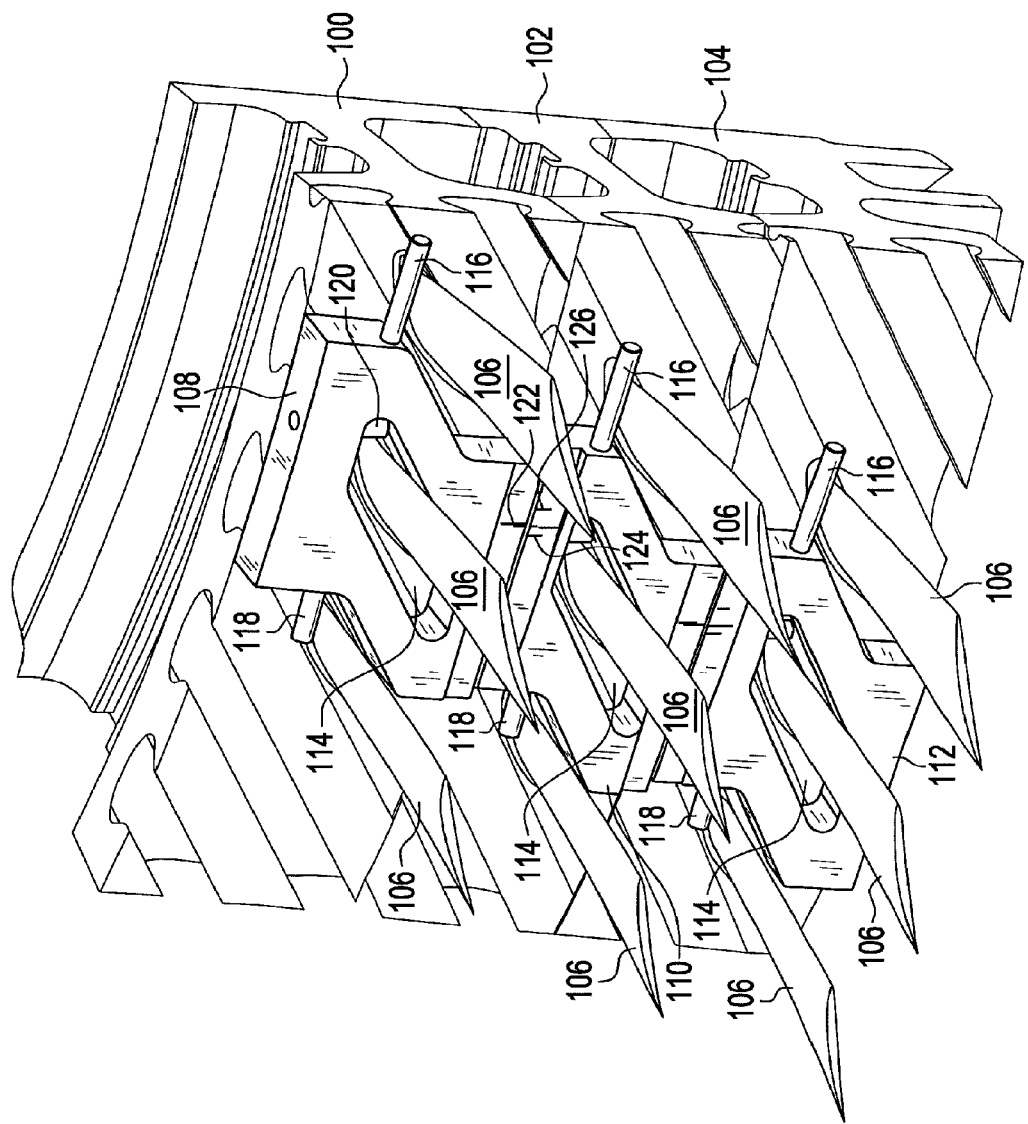
FIG. 1 is perspective view of three adjacent compressor rotor stages having the blade verification plates of an embodiment of the invention placed over one of the blades of each stage.
Figure 2:
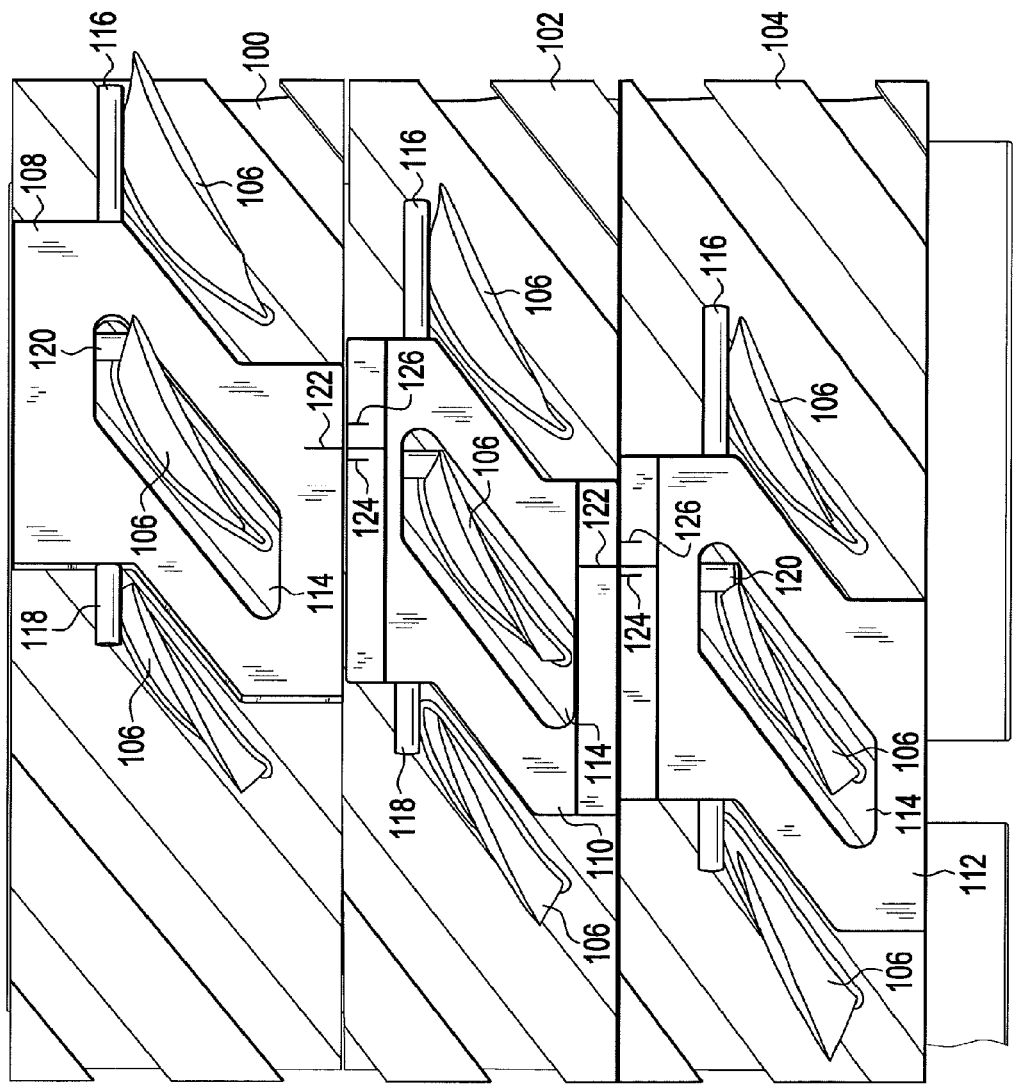
FIG. 2 is a front view of the rotor stages and blade verification plates of FIG. 1.

Referring to FIGS. 1 and 2, there illustrated are three adjacent rotor stages 100, 102, 104 stacked together such that the stages 100-104 are adjacent one another, for example, in a final assembly condition. Each stage 100-104 includes a plurality of blades or airfoils 106 placed around the outer periphery of the corresponding rotor 100-104. Typically, in modern rotors the blades 106 are in a clocked relationship as between any two stages 100-104. The stages 100-104 may comprise those of a turbine engine, such as a steam turbine engine or those that are a part of a compressor of a gas turbine engine. For description purposes, the turbine engine herein will refer to a gas turbine engine, however this is merely for descriptive purposes, and is not intended to limit the invention.

In accordance with an embodiment of the invention, three blade verification plates 108, 110, 112 are provided wherein each plate 108-112 is placed over a corresponding single blade 106 in each of the three rotor stages 100-104. Each plate 108-112 may comprise aluminum or other suitable material and includes an opening 114 through which the blade 106 protrudes. Each verification plate 108-112 includes a pair of dowel pins 116, 118, wherein a first pin 116 contacts the leading edge of the blade 106 on one side of the blade 106 within the opening 114, and a second pin 118 contacts the leading edge of the blade 106 on the other side of the blade 106 within the opening 114. The pins 116, 118 may be coaxial with each other. This way, the leading edge of the blade 106 is properly situated within the opening 114 and the plate 108-112 is positioned "square" with respect to the corresponding rotor 100-104.

Each verification plate 108-112 has another dowel pin 120, disposed perpendicular to the other two pins 116, 118, that contacts the leading edge of the blade 106 within the opening 114 of the corresponding plate 108-112, thereby locating the leading edge of that blade 106. The pins 116-120 may comprise steel or other suitable material. An indicator scribe line 122 is marked on a top surface of at least two of the plates 108, 110 in FIGS. 1-2. The indicator scribe line 122 is positioned with respect to a pair of boundary scribe lines 124, 126 spaced apart a predetermined distance and marked on a top surface of an adjacent plate 110, 112, respectively. The predetermined spacing of the boundary scribe lines 124, 126 is indicative of an acceptable tolerance range for blade clocking between two adjacent rotor stages 100-104. If the indicator scribe line 122 falls within the pair of scribe lines 124, 126 when the blade verification plates 108-112 are placed on the rotor stages 100-104, then a simple indicator is provided that informs the user of the blade verification plates 108-112 that the clocking of the blades of the adjacent rotor stages 100-104 is within an acceptable tolerance range. Conversely, if the indicator scribe line 122 falls outside of the pair of scribe lines 124, 126 when the blade verification plates 108-112 are placed on the rotor stages 100-104, then the clocking of the blades of the adjacent rotor stages 100-104 is outside of an acceptable tolerance range. Thus, the blade verification plates 108-112 of an embodiment of the present invention provide a relatively quick and inexpensive way to determine whether two adjacent rotor stages are properly clocked.

Figure 3:
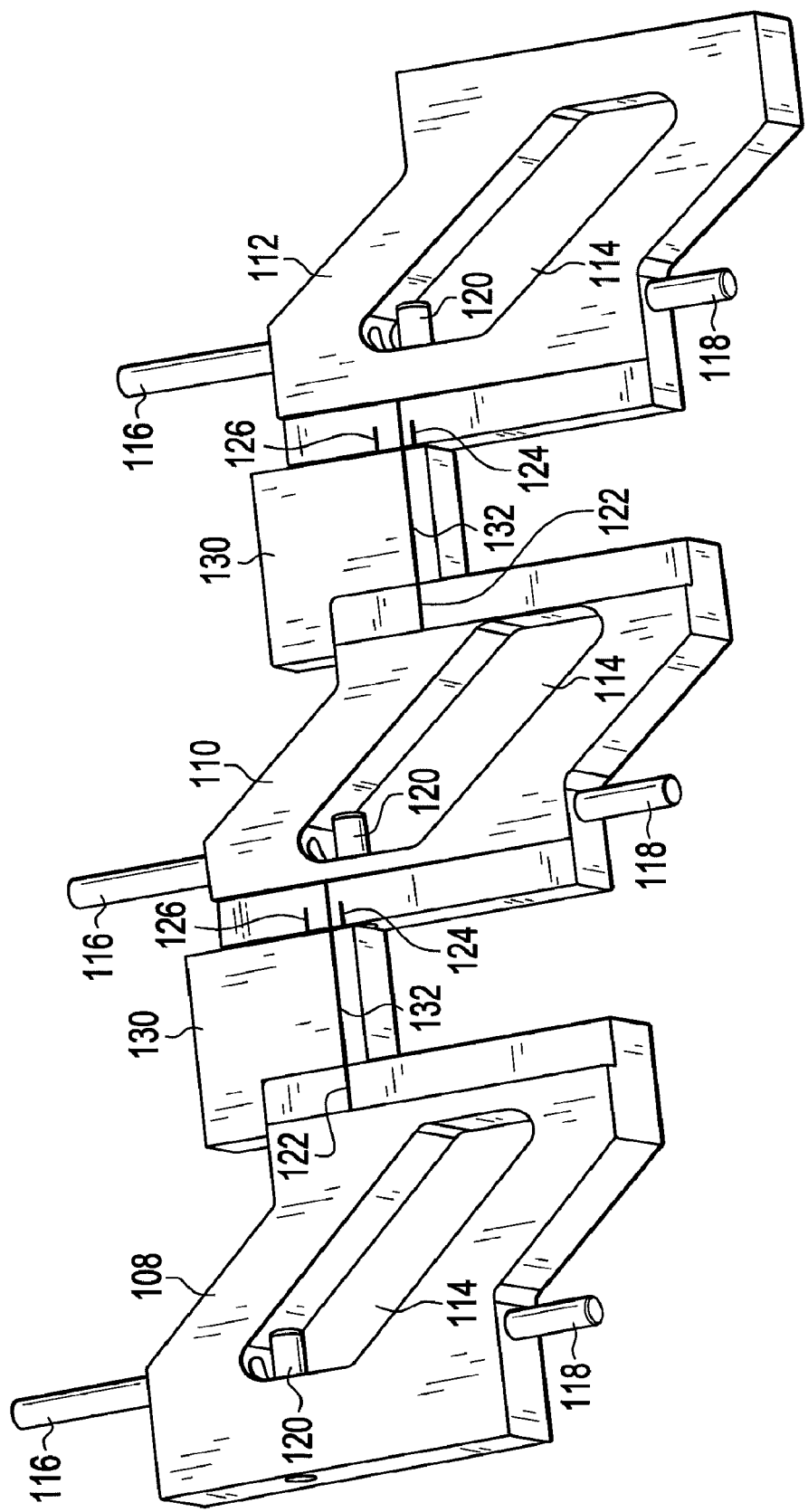
FIG. 3 is a perspective view of three blade verification plates in another embodiment of the invention.
Figure 4:
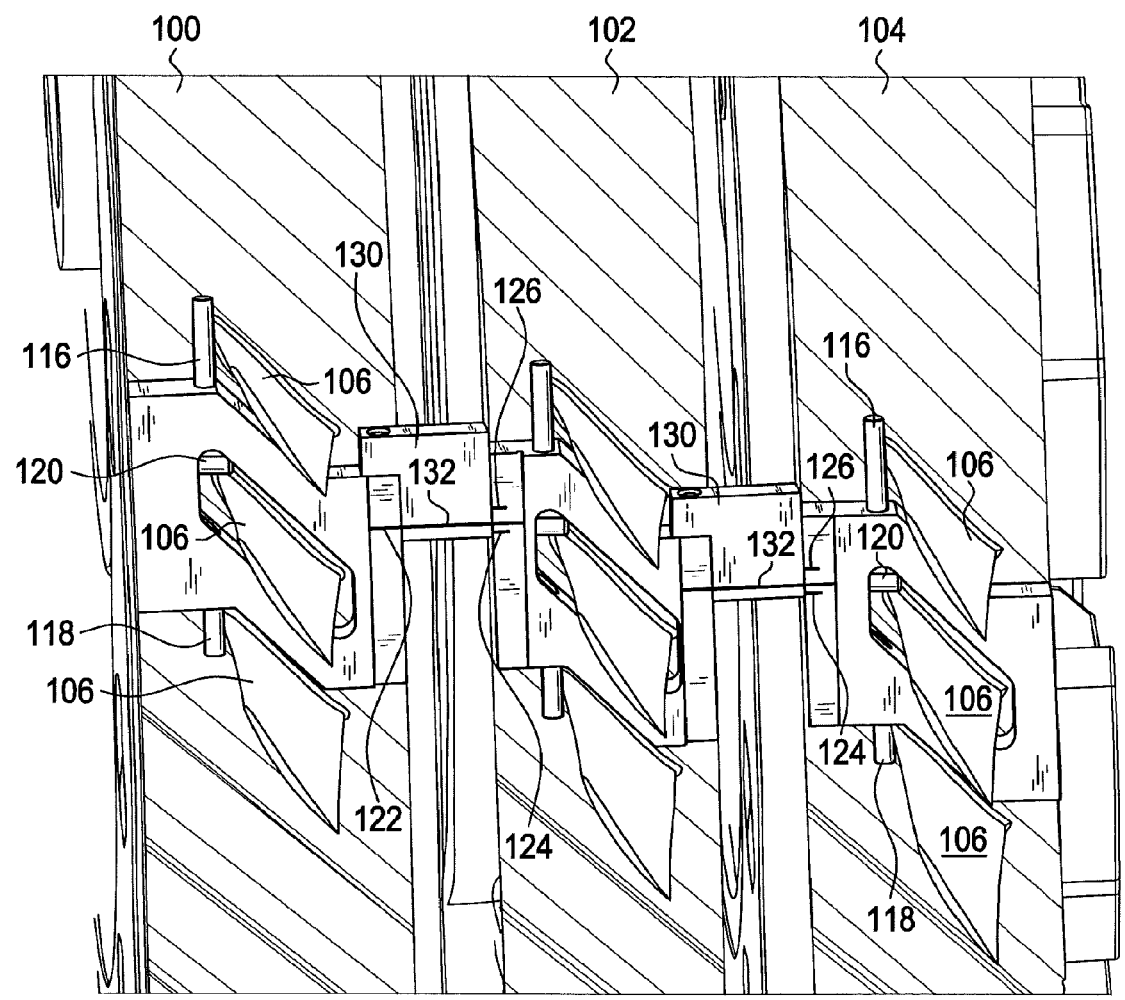
FIG. 4 is a front view of the plates of FIG. 3 placed over one of the blades of each of three compressor rotor stages.
Figure 5:
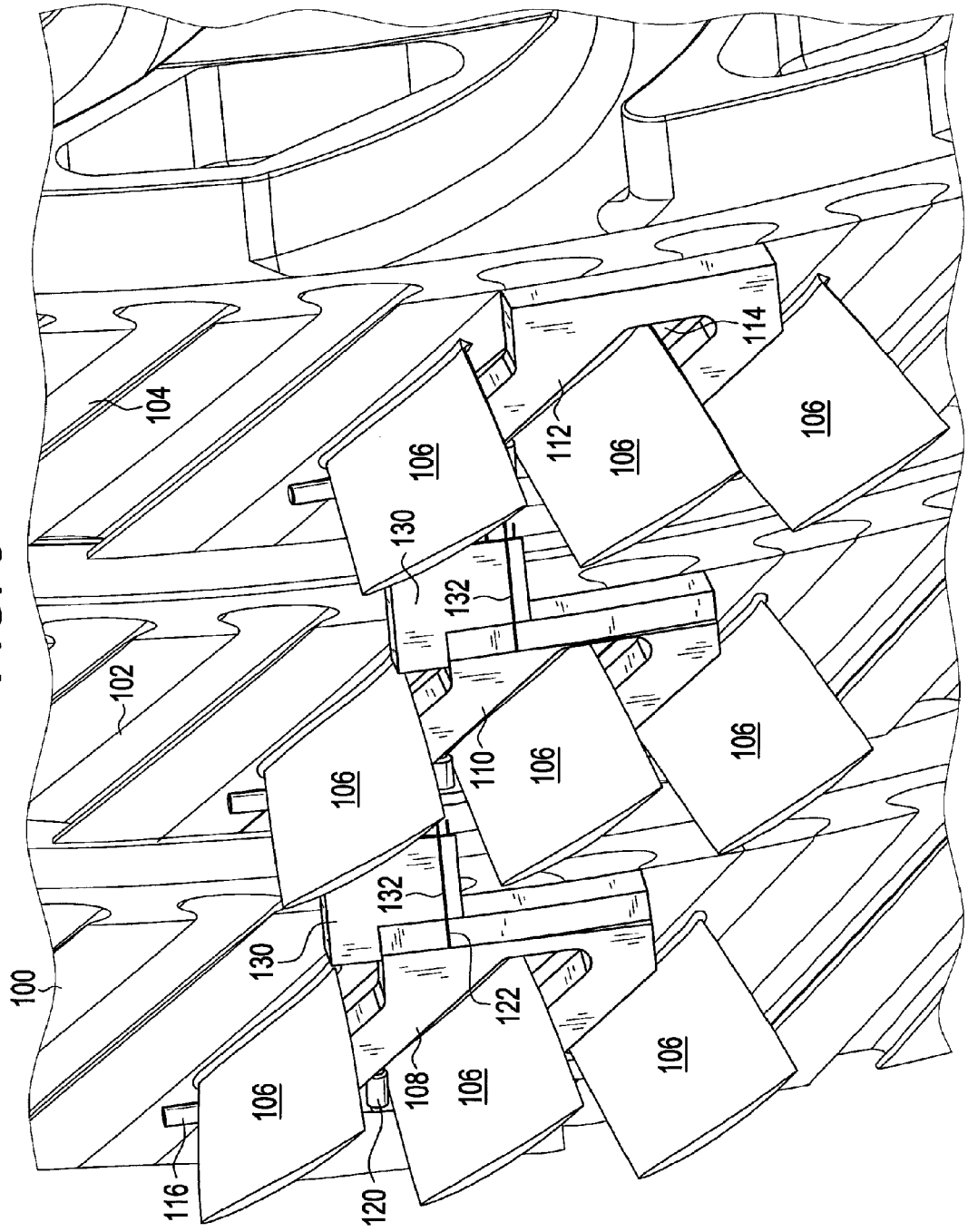
FIG. 5 is a perspective view of the plates of FIG. 3 placed over one of the blades of each of the three compressor rotor stages.

Referring to FIGS. 3-5, there illustrated is another embodiment of the blade verification plates 108-112 of the present invention. The three blade verification plates 108-112 of FIGS. 3-5 are similar in all respects to those illustrated in FIGS. 1-2 and described hereinabove. Thus, like elements are designated with like reference numbers in the figures. In this embodiment, the three rotor stages 100-104 (FIGS. 4-5) have not yet been stacked in a final assembly and are, thus, in a "pre-stacked", spaced apart configuration. Nevertheless, the blade clocking of these stages 100-104 can be checked with the blade verification plates 108-112 of an embodiment of the present invention. The difference between the embodiment of FIGS. 3-5 and that of FIGS. 1-2 is the use of an additional extension scribe 130 that comprises a block of, e.g. aluminum or other suitable material. The purpose of the extension scribe 130 is to compensate for the distance separating the rotor stages 100-104 in the pre-stacked position while still allowing for determining if the blade clocking is within an acceptable tolerance range.

The extension scribe 130 may have an L-shaped cutout that contacts a corner of the corresponding plate 108. An opposite side of the scribe 130 is adjacent the blade verification plate 110 without contacting the plate 110. The extension scribe 130 has a scribe line 132 marked on a top surface thereon that acts as an extension of the indicator scribe line 122 on the plates 108-110 and is co-linear therewith. As such, the scribe line 132 on the extension scribe 130 falls within the pair of scribe lines 124, 126 when the blade clocking is within an acceptable tolerance range. This is so because the position of one of the plates 108 as determined by the position of the blade 106 within the opening 114 of that plate 108 with respect to the position of an adjacent plate 110 is kept constant by the extension scribe 130. That is, the scribe line 132 on the extension scribe 130 follows the position of the indicator scribe line 122 on the plates 108-112. Again, as with the embodiment of FIGS. 1-2, if the scribe line 132 on the extension scribe 130 falls outside of the pair of scribe lines 124, 126 on the adjacent plate 110, then the blade clocking between the blades 106 of the rotor stages 100, 102 is outside of an acceptable tolerance range.

The various embodiments of the invention described and illustrated herein have involved three blade verification plates 108-112; one plate for a blade in each rotor stage 100-104 or "row" of blades. However, it suffices that only two blade verification plates required for the broadest scope of the invention. This is because of the nature of blade clocking described above in which such clocking generally refers to the relative positioning of two rows of blades or airfoils with respect to each other (e.g., the blades on two adjacent stages of a compressor). On the other hand, more than three blade verification plates may also be utilized in embodiments of the invention. The number of plates is primarily a design choice as to how many rotor stages or rows of blades are desired to have their clocking checked at one time.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus, comprising:

a first blade verification plate having an opening configured to be placed over a blade on a first rotor; and a second blade verification plate having an opening configured to be placed over a blade on a second rotor;

each plate including a first pin configured to contact a leading edge of a blade located on one side of the blade within the opening and a second pin configured to contact a leading edge of a blade located on an opposite side of the blade within the opening when each plate is placed over the corresponding blade on each of the first and second rotors;

each plate including a third pin configured to contact a leading edge of the blade located within the opening;

an indicator line marked on the first plate and a pair of boundary lines marked on the second plate and spaced apart a predetermined distance indicative of an acceptable range for blade clocking between the first and second rotors when the indicator line is located between the boundary lines when each plate is placed over the corresponding blade of the first and second rotors.

2. The apparatus of claim 1, further comprising:

a third blade verification plate having an opening configured to be placed over a blade on a third rotor;

the third plate including a first pin configured to contact a leading edge of a blade located on one side of the blade within the opening, a second pin configured to contact a leading edge of a blade located on an opposite side of the blade within the opening when the third plate is placed over the blade on the third rotor, and a third pin configured to contact a leading edge of the blade located within the opening;

an indicator marked on the second plate and a pair of boundary lines marked on the third plate and spaced apart a predetermined distance indicative of an acceptable range for blade clocking between the second and third rotors when the indicator line is located between the boundary lines when the second and third plates are placed over the corresponding blade of the second and third rotors.

3. The apparatus of claim 2, wherein the first and second pins of the third plate are coaxial with each other.

4. The apparatus of claim 2, wherein the third pin of the third plate is perpendicular to the first and second pins of the third plate.

5. The apparatus of claim 2, further comprising an extension scribe disposed between the second and third plates, the extension scribe including a scribe line marked on the extension scribe, the scribe line on the extension scribe being co-linear with the indicator line on the second plate, the boundary lines are spaced apart a predetermined distance indicative of an acceptable range for blade clocking between the second and third rotors when the scribe line on the extension scribe is located between the boundary lines when the second and third plate are each placed over the corresponding blade of the second and third rotors.

6. The apparatus of claim 1, wherein the first, second and third pins each comprise dowel pins.

7. The apparatus of claim 1, wherein the first and second pins of each plate are coaxial with each other.

8. The apparatus of claim 1, wherein the third pin of each plate is perpendicular to the first and second pins.

9. The apparatus of claim 1, further comprising an extension scribe disposed between the first and second plates, the extension scribe including a scribe line marked on the extension scribe, the scribe line on the extension scribe being co-linear with the indicator line on the first plate, the boundary lines are spaced apart a predetermined distance indicative of an acceptable range for blade clocking between the first and second rotors when the scribe line on the extension scribe is located between the boundary lines when each plate is placed over the corresponding blade of the first and second rotors.

10. A method for determining whether blade clocking between first and second rotors each having blades is within an acceptable tolerance range, comprising:
    placing a first blade verification plate having an opening over a blade of the first rotor;
    placing a second blade verification plate having an opening over a blade of the second rotor; and
    determining whether blade clocking between the first and second rotors is within an acceptable tolerance range by inspecting a position of an indicator line marked on the first plate with respect to a pair of boundary lines marked on the second plate, the boundary lines are spaced apart a predetermined distance indicative of an acceptable range for blade clocking between the first and second rotors when the indicator line is located between the boundary lines when each plate is placed over the corresponding blade of the first and second rotors.

11. The method of claim 10, further comprising locating the first plate with respect a blade of the first rotor on either side of the blade within the opening of the first plate by contacting a first pin with a leading edge of a blade located on one side of the blade within the opening and by contacting a second pin with a leading edge of a blade located on an opposite side of the blade within the opening.

12. The method of claim 10, further comprising locating the second plate with respect a blade of the second rotor on either side of the blade within the opening of the second plate by contacting a first pin with a leading edge of a blade located on one side of the blade within the opening and by contacting a second pin with a leading edge of a blade located on an opposite side of the blade within the opening.

13. The method of claim 10, further comprising locating the first plate with respect to a leading edge of the blade within the opening of the first plate by contacting a third pin with the leading edge of the blade located within the opening of the first plate.

14. The method of claim 10, further comprising locating the second plate with respect to a leading edge of the blade within the opening of the second plate by contacting a third pin with the leading edge of the blade located within the opening of the second plate.

15. An apparatus for determining whether a blade clocking between blades of any two rotors is within an acceptable tolerance range, comprising:
    a first blade verification plate having an opening configured to be placed over a blade on a first rotor; and
    a second blade verification plate having an opening configured to be placed over a blade on a second rotor;
    an indicator line marked on the first plate and a pair of boundary lines marked on the second plate and spaced apart a predetermined distance indicative of an acceptable range for blade clocking between the first and second rotors when the indicator line is located between the boundary lines when each plate is placed over the corresponding blade of the first and second rotors.

16. The apparatus of claim 15, wherein each plate includes a first pin configured to contact a leading edge of a blade located on one side of the blade within the opening and a second pin configured to contact a leading edge of a blade located on an opposite side of the blade within the opening when each plate is placed over the corresponding blade on each of the first and second rotors.

17. The apparatus of claim 16, wherein each plate includes a third pin configured to contact a leading edge of the blade located within the opening.

18. The apparatus of claim 15, further comprising an extension scribe disposed between the first and second plates, the extension scribe includes a scribe line marked on the extension scribe, the scribe line on the extension scribe being co-linear with the indicator line on the first plate, the boundary lines are spaced apart a predetermined distance indicative of an acceptable range for blade clocking between the first and second rotors when the scribe line on the extension scribe is located between the boundary lines when each plate is placed over the corresponding blade of the first and second rotors.

19. The apparatus of claim 15, further comprising:
    a third blade verification plate having an opening configured to be placed over a blade on a third rotor;
    an indicator line marked on the second plate and a pair of boundary lines marked on the third plate and spaced apart a predetermined distance indicative of an acceptable range for blade clocking between the second and third rotors when the indicator line is located between the boundary lines when the second and third plates are placed over the corresponding blade of the second and third rotors.

20. The apparatus of claim 19, wherein the third plate includes a first pin configured to contact a leading edge of a blade located on one side of the blade within the opening, a second pin configured to contact a leading edge of a blade located on an opposite side of the blade within the opening when the third plate is placed over the blade on the third rotor, and a third pin configured to contact a leading edge of the blade located within the opening.

* * * * *